United States Patent
Takahashi et al.

(10) Patent No.: US 8,371,985 B2
(45) Date of Patent: Feb. 12, 2013

(54) SHIFT CONTROL OF CONTINUOUSLY VARIABLE TRANSMISSION

(75) Inventors: Seiichiro Takahashi, Isehara (JP); Hiroyasu Tanaka, Atsugi (JP); Ryousuke Nonomura, Kawasaki (JP); Jouji Seki, Zama (JP); Takuichiro Inoue, Fujisawa (JP); Mamiko Inoue, Ebina (JP); Tatsuo Ochiai, Oiso-machi (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 272 days.

(21) Appl. No.: 12/837,129

(22) Filed: Jul. 15, 2010

(65) Prior Publication Data

US 2011/0015838 A1    Jan. 20, 2011

(30) Foreign Application Priority Data

Jul. 17, 2009  (JP) .................. 2009-169178

(51) Int. Cl.
  *F16H 61/66*  (2006.01)
(52) U.S. Cl. ............... 477/41; 477/43; 701/56
(58) Field of Classification Search ............ 477/41, 477/43, 46; 701/55, 56
  See application file for complete search history.

(56) References Cited

U.S. PATENT DOCUMENTS

| | | |
|---|---|---|
| 4,672,863 A | 6/1987 | Itoh et al. |
| 4,674,359 A | 6/1987 | Hattori |
| 4,793,217 A | 12/1988 | Morisawa et al. |
| 5,207,122 A | 5/1993 | Minagawa |
| 5,282,401 A | 2/1994 | Hebbale et al. |
| 5,427,579 A | 6/1995 | Kanehara et al. |
| 5,456,647 A | 10/1995 | Holbrook |
| 5,468,198 A | 11/1995 | Holbrook et al. |
| 5,827,153 A | 10/1998 | Yasue et al. |
| 5,947,856 A | 9/1999 | Tabata et al. |

(Continued)

FOREIGN PATENT DOCUMENTS

| | | |
|---|---|---|
| DE | 34 24 646 A1 | 2/1985 |
| DE | 100 51 692 A1 | 5/2001 |

(Continued)

OTHER PUBLICATIONS

R. Nonomura et al., US PTO Notice of Allowance, U.S. Appl. No. 12/828,604, dated Feb. 13, 2012, (17 pgs.).

(Continued)

*Primary Examiner* — Sherry Estremsky
(74) *Attorney, Agent, or Firm* — Foley & Lardner LLP

(57) ABSTRACT

A continuously variable transmission 4 for a vehicle includes a variator 20 that modifies a speed ratio continuously and a subtransmission mechanism 30 that is connected in series to the variator 20 and applies a first speed and a second speed, which is higher than the first speed, selectively. When the vehicle is running under a low load/high speed upshift condition having a lower load or a higher speed than a normal upshift condition, the subtransmission mechanism 30 is upshifted from the first speed to the second speed at a lower vehicle speed than under the normal upshift condition, and as a result, both rotation variation in an internal combustion engine 1 accompanying upshifting of the subtransmission mechanism 30 and an increase in a fuel consumption amount of the internal combustion engine 1 due to the shift operation in the continuously variable transmission 4 are suppressed.

9 Claims, 10 Drawing Sheets

U.S. PATENT DOCUMENTS

| | | | |
|---|---|---|---|
| 6,157,884 A | 12/2000 | Narita et al. | |
| 6,295,497 B1 | 9/2001 | Kuras | |
| 7,108,631 B2 | 9/2006 | Inoue et al. | |
| 7,637,836 B2 | 12/2009 | Watanabe et al. | |
| 7,780,570 B2 | 8/2010 | Iwatsuki et al. | |
| 8,052,572 B2 * | 11/2011 | Unno | 477/43 |
| 8,131,436 B2 | 3/2012 | Suzuki et al. | |
| 8,187,145 B2 | 5/2012 | Kaminsky et al. | |
| 8,204,659 B2 | 6/2012 | Kouno et al. | |
| 8,214,093 B2 | 7/2012 | Heap et al. | |
| 2006/0089775 A1 | 4/2006 | Whitton et al. | |
| 2007/0129922 A1 | 6/2007 | Lee et al. | |
| 2008/0020896 A1 | 1/2008 | Kamishima | |
| 2008/0032861 A1 | 2/2008 | Maki et al. | |
| 2008/0096721 A1 | 4/2008 | Honma et al. | |
| 2009/0105041 A1 | 4/2009 | McKenzie et al. | |
| 2009/0111650 A1 | 4/2009 | Joen | |
| 2010/0057316 A1 | 3/2010 | Tanaka et al. | |
| 2010/0228412 A1 | 9/2010 | Sah | |

FOREIGN PATENT DOCUMENTS

| | | |
|---|---|---|
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 A | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 63-266264 A | 11/1988 |
| JP | 63-266265 A | 11/1988 |
| JP | 4-211760 A | 8/1992 |
| JP | 5-10427 A | 1/1993 |
| JP | 05-026317 A | 2/1993 |
| JP | 5-71627 A | 3/1993 |
| JP | 05-079554 A | 3/1993 |
| JP | 6-331013 A | 11/1994 |
| JP | 06-331016 A | 11/1994 |
| JP | 8-178043 A | 7/1996 |
| JP | 9-210165 A | 8/1997 |
| JP | 10-299880 A | 11/1998 |
| JP | 11-51162 A | 2/1999 |
| JP | 11-082721 A | 3/1999 |
| JP | 11-093987 A | 4/1999 |
| JP | 11-182663 A | 7/1999 |
| JP | 11-210874 A | 8/1999 |
| JP | 2000-145939 A | 5/2000 |
| JP | 2000-266173 A | 9/2000 |
| JP | 2000-346169 A | 12/2000 |
| JP | 2002-89701 A | 3/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2007-92665 A | 4/2007 |
| JP | 2007-118727 A | 5/2007 |
| JP | 2007-146906 A | 6/2007 |
| JP | 2008-059052 A | 3/2008 |

OTHER PUBLICATIONS

R. Nonomura et al., US PTO Notice of Allowance, U.S. Appl. No. 12/828,604, dated Jun. 7, 2012, (12 pgs.).
U.S. Appl. No. 12/836,021, filed Jul. 14, 2010, Nonomura et al.
U.S. Appl. No. 12/836,099, filed Jul. 14, 2010, Takahashi et al.
U.S. Appl. No. 12/836,104, filed Jul. 14, 2010, Takahashi et al.
U.S. Appl. No. 12/836,128, filed Jul. 14, 2010, Takahashi et al.
U.S. Appl. No. 12/837,133, filed Jul. 15, 2010, Takahashi et al.
U.S. Appl. No. 12/836,172, filed Jul. 14, 2010, Takahashi et al.
U.S. Appl. No. 12/828,604, filed Jul. 1, 2010, Nonomura et al.
S. Takahashi et al., US PTO Notice of Allowance on U.S. Appl. No. 12/836,021 DTD Oct. 5, 2012, (45 pgs.).
S. Takahashi et al., US PTO Office Action on U.S. Appl. No. 12/836,099 DTD Sep. 18, 2012, (23 pgs.).
S. Takahashi et al. US PTO Office Action on U.S. Appl. No. 12/836,104 DTD Sep. 24, 2012, (24 pgs.).
S. Takahashi et al., US PTO Notice of Allowance on U.S. Appl. No. 12/836,128 DTD Sep. 17, 2012, (50 pgs.).
S. Takahashi et al., US PTO Notice of Allowance on U.S. Appl. No. 12/836,172 DTD Oct. 19, 2012, (20 pgs.).

* cited by examiner

SHIFT CONTROL OF CONTINUOUSLY VARIABLE TRANSMISSION

FIELD OF THE INVENTION

This invention relates to shift control performed on a continuously variable transmission comprising a continuously variable transmission mechanism and a subtransmission mechanism.

BACKGROUND OF THE INVENTION

A continuously variable transmission is a transmission which is capable of varying a speed ratio continuously.

In a vehicle installed with a continuously variable transmission, an internal combustion engine can be operated more efficiently than in a vehicle having a conventional stepped transmission, and therefore improvements in a power performance and a fuel performance of the vehicle can be expected.

To improve the power performance and fuel efficiency performance of a vehicle installed with a continuously variable transmission even further, a possible speed ratio range (to be referred to hereafter as a "ratio range") of the continuously variable transmission is preferably enlarged.

When the ratio range of the continuously variable transmission is enlarged, a speed ratio further toward a Low side is used during startup and acceleration, enabling an improvement in the power performance of the vehicle, and a speed ratio further toward a High side is used during high-speed travel, enabling an improvement in the fuel efficiency performance of the vehicle.

To enlarge the ratio range of a belt continuously variable transmission, a diameter of pulleys around which the belt is wound may be increased. However, an increase in pulley diameter inevitably leads to an increase in the size of the continuously variable transmission.

JP2000-346169A, published by the Japan Patent Office in 2000, proposes that a subtransmission mechanism having two forward speeds be provided in series with the continuously variable transmission either between the internal combustion engine and the continuously variable transmission or between the continuously variable transmission and a final gear. According to this prior art, by modifying a gear position of the subtransmission mechanism in accordance with operating conditions of the vehicle, the ratio range can be enlarged without increasing the size of the continuously variable transmission.

SUMMARY OF THE INVENTION

In this continuously variable transmission, when the subtransmission mechanism is upshifted from a first speed to a second speed, the speed ratio of the continuously variable transmission is varied in an opposite direction, i.e. downshifted, thereby suppressing variation in an output rotation speed of the internal combustion engine. However, it is difficult to coordinate the upshift in the subtransmission mechanism and the downshift in the continuously variable transmission perfectly, and therefore temporary variation in the rotation speed of the internal combustion engine is inevitable. This rotation variation causes shift shock.

Rotation variation in the internal combustion engine accompanying an upshift in the subtransmission mechanism is suppressed by performing the upshift in the subtransmission mechanism in a region where the speed ratio of the continuously variable transmission is closer to a minimum speed ratio. Therefore, to suppress rotation variation in the internal combustion engine, an upshift in the subtransmission mechanism is preferably performed in the vicinity of the minimum speed ratio of the continuously variable transmission.

However, when the continuously variable transmission is constituted by a belt type continuously variable transmission and the continuously variable transmission is operated in the vicinity of the minimum speed ratio, a fuel consumption amount of the internal combustion engine increases in comparison with a case in which the continuously variable transmission is operated at a speed ratio close to 1.0. In the vicinity of the minimum speed ratio, respective contact radii between two pulleys of the belt type continuously variable transmission and the belt must be differentiated greatly. To differentiate the respective contact radii between the two pulleys and the belt greatly, a differential pressure of the oil pressures applied to the two pulleys must be increased. When the speed ratio is 1.0, on the other hand, the contact radii can be made equal and equal pressure can be applied to the two pulleys.

Hence, when the continuously variable transmission is operated in the vicinity of the minimum speed ratio, a load of a hydraulic pump that supplies the oil pressure increases, and as a result, the fuel consumption amount of the internal combustion engine that drives the hydraulic pump inevitably increases in comparison with a case where the continuously variable transmission is operated at a speed ratio close to 1.0.

It is therefore an object of this invention to suppress both rotation variation in an internal combustion engine accompanying an upshift in a subtransmission mechanism and an increase in an amount of fuel consumed by the internal combustion engine during a shift operation in the continuously variable transmission.

In order to achieve the above object, this invention provides a shift control device for a continuously variable transmission that is connected to an internal combustion engine installed in a vehicle. The continuously variable transmission comprises a continuously variable transmission mechanism that modifies a speed ratio continuously and a subtransmission mechanism that is connected in series to the continuously variable transmission mechanism and applies a first speed and a second speed that is higher than the first speed selectively.

The shift control device comprises a sensor that detects an operating condition of the vehicle and a programmable controller programmed to determine, on the basis of the operating condition of the vehicle, whether the vehicle is running under a normal upshift condition or under a low load/high speed upshift condition having a lower load or a higher speed than the normal upshift condition, and when the vehicle is running under the low load/high speed upshift condition, control the subtransmission mechanism such that the subtransmission mechanism is upshifted from the first speed to the second speed at a lower vehicle speed than when the vehicle is running under the normal upshift condition.

This invention also provides a shift control method for the continuously variable transmission comprising detecting an operating condition of the vehicle, determining, on the basis of the operating condition of the vehicle, whether the vehicle is running under a normal upshift condition or under a low load/high speed upshift condition having a lower load or a higher speed than the normal upshift condition, and controlling the subtransmission mechanism when the vehicle is running under the low load/high speed upshift condition such that the subtransmission mechanism is upshifted from the first speed to the second speed at a lower vehicle speed than when the vehicle is running under the normal upshift condition.

This invention also provides a shift control device for the continuously variable transmission comprising a controller programmed to control the subtransmission mechanism such that the subtransmission mechanism performs an upshift from the first speed to the second speed when a vehicle speed passes a minimum vehicle speed for an upshift, which is determined from a minimum input rotation speed of the continuously variable transmission at which the vehicle can maintain the vehicle speed on a flat road and a speed ratio of the continuously variable transmission at which a torque loss generated in the continuously variable transmission when the subtransmission mechanism is at the first speed equals a torque loss generated in the continuously variable transmission when the subtransmission mechanism is at the second speed, and a rotation speed of the continuously variable transmission is equal to or lower than the minimum input rotation speed of the continuously variable transmission corresponding to a minimum rotation speed of the internal combustion engine.

The details as well as other features and advantages of this invention are set forth in the remainder of the specification and are shown in the accompanying drawings.

DESCRIPTION OF THE PREFERRED EMBODIMENTS

In the following description, a "speed ratio" of a certain transmission mechanism is a value obtained by dividing an input rotation speed of a transmission mechanism by an output rotation speed of the transmission mechanism.

A "Lowest speed ratio" denotes a maximum speed ratio of the transmission mechanism, and a "Highest speed ratio" denotes a minimum speed ratio of the transmission mechanism.

Figure 1:
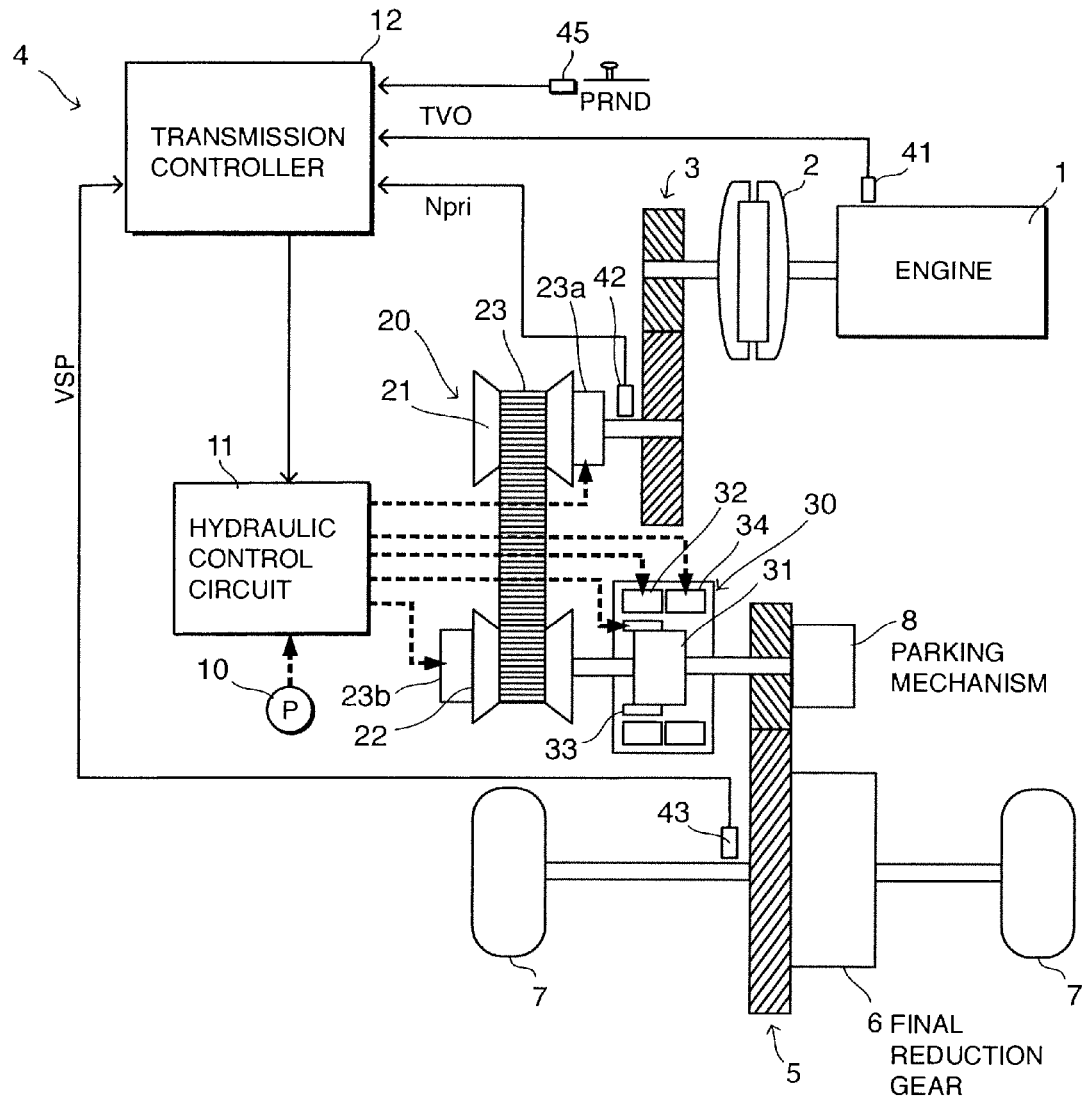
FIG. 1 is a schematic diagram showing the constitution of a vehicle drive system employing a continuously variable transmission according to this invention.

Referring to FIG. 1 of the drawings, a vehicle driving system including a continuously variable transmission 4 according to this invention comprises an internal combustion engine 1 as a power source. Output rotation of the internal combustion engine 1 is transmitted to drive wheels 7 via a torque converter having a lockup clutch 2, a first gear train 3, the continuously variable transmission 4, a second gear train 5, and a final reduction gear 6. The second gear train 5 is provided with a parking mechanism 8 which locks an output shaft of the continuously variable transmission 4 mechanically so that the output shaft is incapable of rotation during parking.

The continuously variable transmission 4 comprises a belt type continuously variable transmission mechanism (to be referred to as a "variator 20" hereafter), and a subtransmission mechanism 30 provided between the variator 20 and the second gear train 5a.

The subtransmission mechanism 30 may be directly connected to an output shaft of the variator 20, as in this example, or via another transmission mechanism or power transmission mechanism, for example, a gear train.

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23a, 23b that is provided on a back surface of the movable conical plate and displaces the movable conical plate in an axial direction. When an oil pressure supplied to the hydraulic cylinder 23a, 23b is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism.

The subtransmission mechanism 30 includes a Ravigneaux planetary gear mechanism 31 coupling the carriers of two planetary gears, and a plurality of frictional engagement elements, namely a Low brake 32, a High clutch 33, and a Reverse (Rev) brake 34, connected to a plurality of rotary elements constituting the Ravigneaux planetary gear mechanism 31 to modify the rotation states thereof.

The gear position of the subtransmission mechanism 30 is changed by adjusting the oil pressure supplied to the respective frictional engagement elements 32 to 34 such that the engagement/disengagement states of the respective frictional engagement elements 32 to 34 are modified.

For example, by engaging the Low brake 32 and disengaging the High clutch 33 and Rev brake 34, the gear position of the subtransmission mechanism 30 is set in a first speed.

By engaging the High clutch 33 and disengaging the Low brake 32 and Rev brake 34, the gear position of the subtransmission mechanism 30 is set in a second speed having a smaller speed ratio than the first speed.

By engaging the Rev brake 34 and disengaging the Low brake 32 and the High clutch 33, the gear position of the subtransmission mechanism 30 is set in reverse.

It should be noted that in the following description, a state in which the gear position of the subtransmission mechanism 30 is in the first speed will be expressed as "the continuously variable transmission 4 is in a low speed mode", and a state in which the gear position of the subtransmission mechanism 30 is in the second speed will be expressed as "the continuously variable transmission 4 is in a high speed mode".

In this embodiment, the variator 20 is constituted by a belt-type continuously variable transmission mechanism, but the variator 20 is not limited thereto. A chain-type continuously variable transmission mechanism in which a chain is sandwiched by pulleys, a toroidal continuously variable transmission mechanism including a full toroidal type and a half toroidal type, or any other type of continuously variable transmission mechanism may constitute the variator 20.

The continuously variable transmission 4 further comprises an oil pump 10 which is driven using a part of the power of the internal combustion engine 1, a hydraulic control circuit 11 which regulates an oil pressure from the oil pump 10 and supplies a regulated oil pressure to various sites of the continuously variable transmission 4, and a transmission controller 12 which controls the hydraulic control circuit 11.

Figure 2:
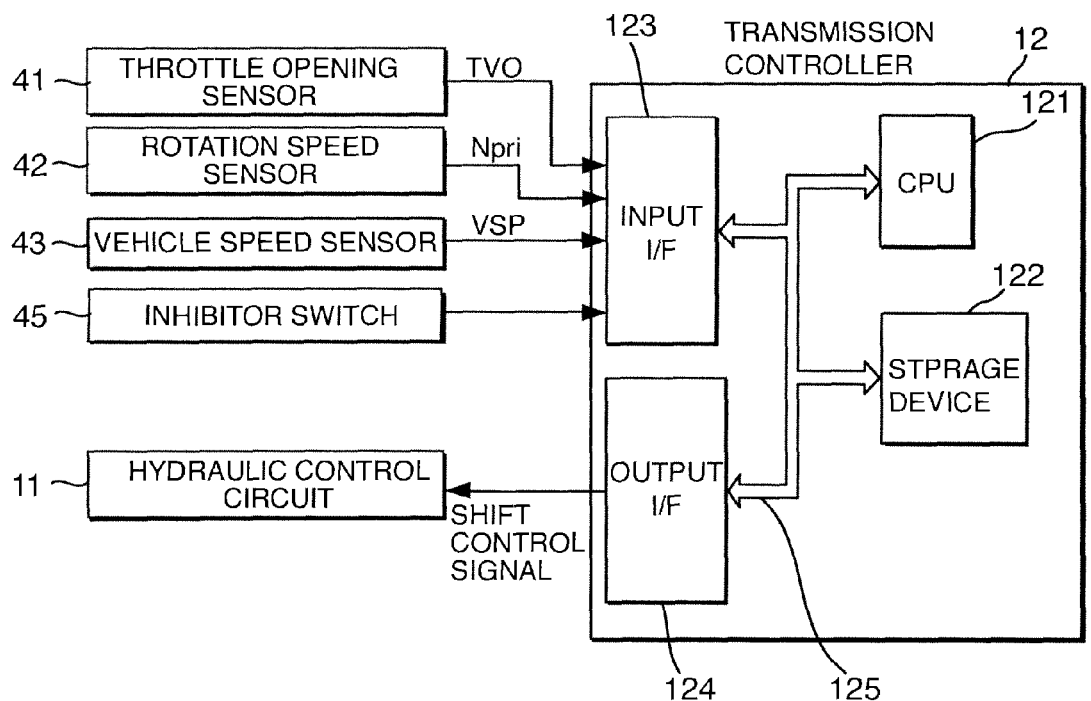
FIG. 2 is a block diagram showing the constitution of a shift controller according to this invention.

Referring to FIG. 2, the transmission controller 12 is constituted by a CPU 121, a storage device 122 including a RAM and a ROM, an input interface 123, an output interface 124, and a bus 125 connecting these components to each other.

An output signal from a throttle opening sensor 41 that detects an opening of a throttle valve of the internal combustion engine 1 (to be referred to as a "throttle opening TVO" hereafter), an output signal from a rotation speed sensor 42 that detects an input rotation speed of the continuously variable transmission 4, which is equal to the rotation speed of the primary pulley 21 (to be referred to as a "primary rotation speed Npri"), an output signal from a vehicle speed sensor 43 that detects a traveling speed of the vehicle (to be referred to hereafter as a "vehicle speed VSP"), an output signal from an inhibitor switch 45 that detects a position of a select lever with which the vehicle is provided are input into the input interface 123.

The storage device 122 stores a shift control program for the continuously variable transmission 4 and a shift map used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the continuously variable transmission 4. As a result, the speed ratio vRatio of the variator 20 is modified and the gear position of the subtransmission mechanism 30 is changed, whereby a shift is performed in the continuously variable transmission 4.

Figure 3:
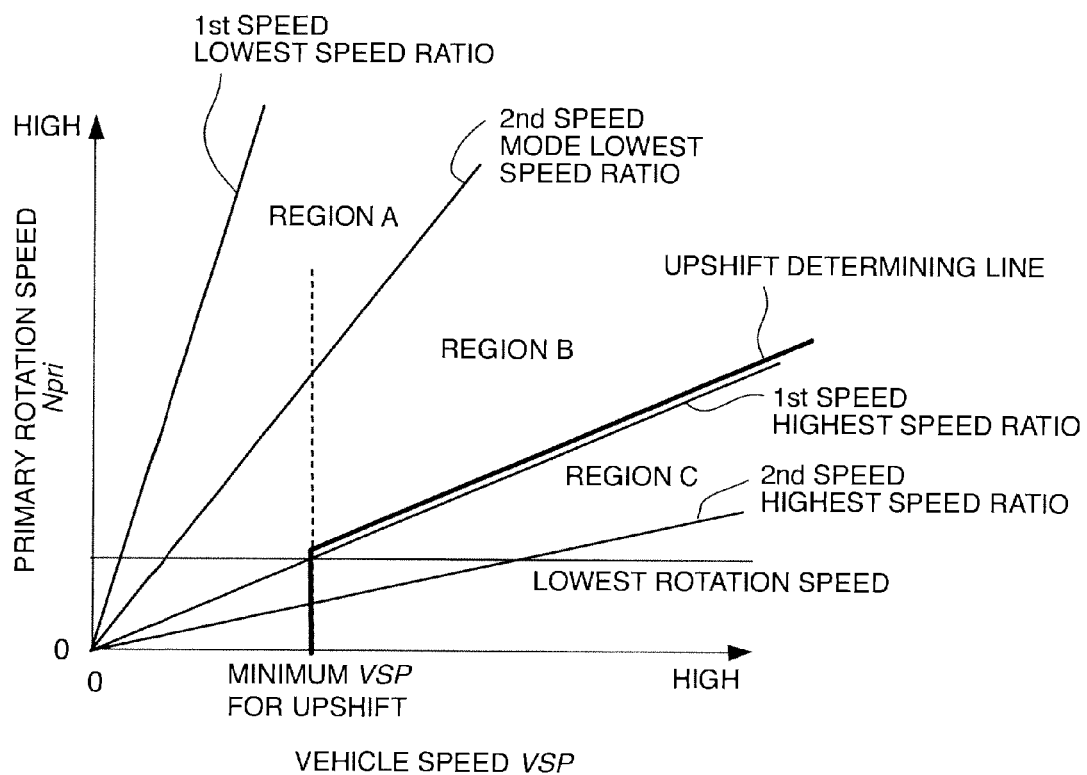
FIG. 3 is a diagram showing upshift characteristics of a continuously variable transmission according to the prior art.

FIG. 3 shows characteristics of a conventional shift map stored in advance in a storage device 122 of the shift controller 12 in the continuously variable transmission 4 in which the variator 20 and the subtransmission mechanism 30 are provided in series.

On the shift map, an operating point of the continuously variable transmission 4 is determined on the basis of the vehicle speed VSP and the primary rotation speed Npri.

The incline of a line linking the operating point of the continuously variable transmission 4 and a zero point in a lower left corner of the shift map represents the speed ratio of the continuously variable transmission 4 (an overall speed ratio obtained by multiplying the speed ratio of the subtransmission mechanism 30 by the speed ratio vRatio of the variator 20; to be referred to hereafter as a "through speed ratio Ratio").

Further, a lowest rotation speed line indicates a lowest rotation speed of the primary rotation speed Npri based on a lowest rotation speed of the internal combustion engine 1. Here, the lowest rotation speed of the internal combustion engine 1 takes a slightly larger value than an idling rotation speed.

On the shift map, a shift line is preset for each throttle opening TVO, and shifts are performed in the continuously variable transmission 4 in accordance with a shift line selected on the basis of the throttle opening TVO.

When the subtransmission mechanism 30 is in the first speed, a shift can be performed between a first speed Lowest speed ratio line obtained by maximizing the speed ratio vRatio of the variator 20 and a first speed Highest speed ratio line obtained by minimizing the speed ratio vRatio of the variator 20.

At this time, the operating point of the continuously variable transmission 4 moves within an A region and a B region.

When the subtransmission mechanism 30 is upshifted to the second speed, on the other hand, a shift can be performed between a second speed Lowest speed ratio line obtained by maximizing the speed ratio vRatio of the variator 20 and a second speed Highest speed ratio line obtained by minimizing the speed ratio vRatio of the variator 20.

At this time, the operating point of the continuously variable transmission 4 moves within the B region and a C region.

Hence, a range of the through speed ratio Ratio of the continuously variable transmission 4 that can be obtained by the subtransmission mechanism 30 in the first speed, i.e. the A region and the B region, and a range of the through speed ratio Ratio of the continuously variable transmission 4 that can be obtained in the second speed, i.e. the B region and the C region, overlap in the B region.

When the through speed ratio Ratio is in the B region sandwiched between the second speed Lowest speed ratio line and the first speed Highest speed ratio line, the subtransmission mechanism 30 can select either of the first speed and the second speed.

Furthermore, on this shift map, an upshift determining line on which the subtransmission mechanism 30 is upshifted from the first speed to the second speed is set in the vicinity of the first speed Highest speed ratio line.

It should be noted that in the figure, a vehicle speed at which the lowest rotation speed line crosses the upshift determining line is set as a minimum vehicle speed for an upshift. The minimum vehicle speed for an upshift is the lowest vehicle speed at which upshifting of the subtransmission mechanism 30 can be requested. A method of determining the minimum vehicle speed for an upshift will be described in detail below.

When the operating point of the continuously variable transmission 4 crosses the upshift determining line in the figure, or in other words when the through speed ratio Ratio of the continuously variable transmission 4 varies across the upshift determining line, the shift controller 12 performs an upshift or a downshift in the subtransmission mechanism 30.

It should be noted that at this time, the shift controller 12 performs an upshift in the subtransmission mechanism 30 and modifies the speed ratio vRatio of the variator 20 in an opposite direction to a speed ratio variation direction of the subtransmission mechanism 30.

More specifically, when the through speed ratio Ratio of the continuously variable transmission 4 varies from a state of being larger than the upshift determining line to a state of being smaller, the shift controller 12 modifies the gear position of the subtransmission mechanism 30 from the first speed to the second speed.

At the same time, the shift controller 12 performs an operation to increase the speed ratio vRatio of the variator 20 to a Low side.

Conversely, when the through speed ratio Ratio of the continuously variable transmission 4 shifts from a state of being smaller than the upshift determining line to a state of being larger, the shift controller 12 shifts the gear position of the subtransmission mechanism 30 from the second speed to the first speed.

At the same time, the shift controller 12 performs an operation to reduce the speed ratio vRatio of the variator 20 to a High side.

The reason for causing the speed ratio vRatio of the variator 20 to vary in the opposite direction to the speed ratio variation direction of the subtransmission mechanism 30 is to prevent a driver from experiencing an unpleasant sensation caused by variation in an input rotation speed of the continuously variable transmission 4 occurring when the through speed ratio Ratio of the continuously variable transmission 4 varies in a stepped fashion.

An operation in which the speed ratio of the subtransmission mechanism 30 and the speed ratio vRatio of the variator 20 are varied in opposite directions to suppress variation in the through speed ratio Ratio will be referred to in the embodiments of this invention as a "coordinated shift".

The variator 20, which is constituted by a belt type continuously variable transmission mechanism, achieves the greatest efficiency in terms of the fuel consumption of the internal combustion engine 1 when it operates at a speed ratio vRatio close to 1.0.

On the other hand, shift shock generated by the subtransmission mechanism 30 at a constant engine torque decreases as the speed ratio vRatio of the variator 20 shifts toward the High side.

Further, a target value of the through speed ratio Ratio can be reached without shifting the subtransmission mechanism 30, i.e. while holding the subtransmission mechanism 30 at the first speed, when an operating condition is on the Low side of the first speed Highest speed ratio line in FIG. 3, or in other words in the B region.

To summarize the above, an upshift in the subtransmission mechanism 30 from the first speed to the second speed is preferably implemented in the vicinity of the Highest speed ratio of the variator 20 in order to suppress shift shock. At or below the minimum vehicle speed for an upshift, the required speed ratio can be realized without upshifting the subtransmission mechanism 30 from the first speed to the second speed, and therefore an upshift need not be implemented in the subtransmission mechanism 30.

On the other hand, when steady state travel is underway in the vicinity of the lowest rotation speed of the internal combustion engine 1 in a case where setting has been performed such that the subtransmission mechanism 30 is upshifted in the vicinity of the Highest speed ratio of the variator 20, the subtransmission mechanism 30 is held at the first speed such that the vehicle travels with the variator 20 in the vicinity of the Highest speed ratio. As a result, the fuel consumption of the internal combustion engine 1 may increase.

Figure 4A:
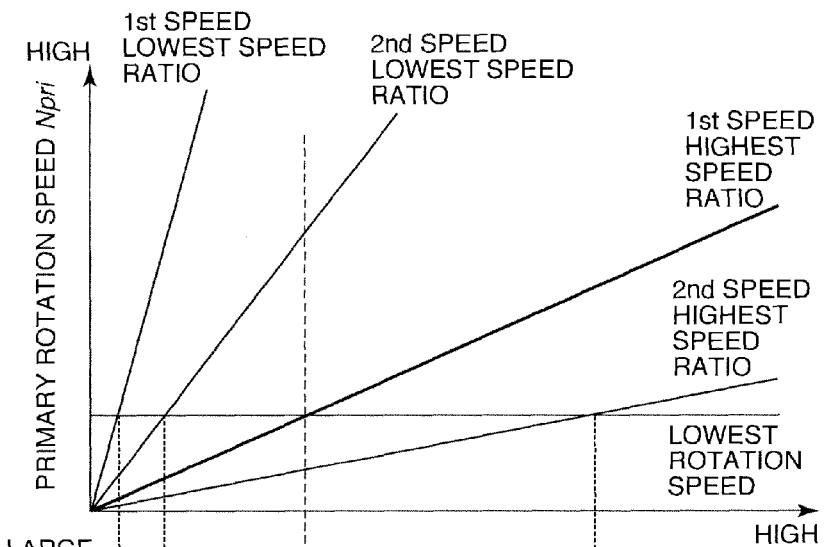
FIGS. 4A-4C are diagrams showing upshift characteristics of a subtransmission mechanism and a continuously variable transmission mechanism according to the prior art.
Figure 4B:
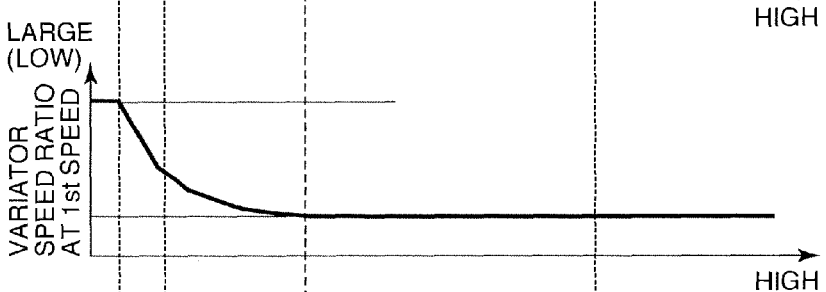
Figure 4C:
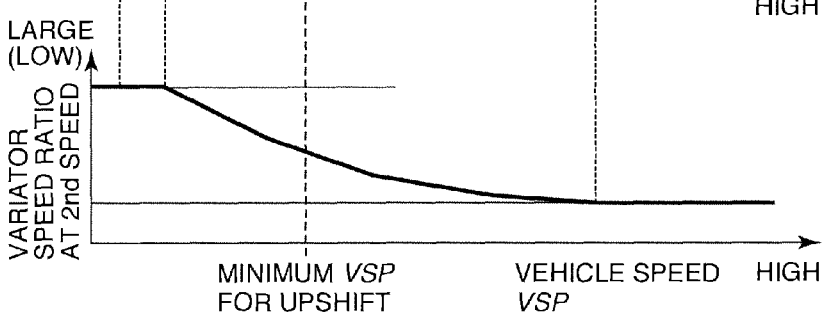

FIGS. 4A-4C show a relationship between the speed ratio vRatio of the variator 20 and the vehicle speed VSP when the subtransmission mechanism 30 is at the first speed or the second speed.

In FIG. 4A, when the through speed ratio Ratio is in the B region sandwiched between the second speed Lowest speed ratio line and the first speed Highest speed ratio line, the subtransmission mechanism 30 can be set in either the first speed or the second speed.

A "variator speed ratio at the first speed" in FIG. 4B illustrates variation in the speed ratio vRatio of the variator 20 relative to the vehicle speed VSP when the vehicle speed VSP gradually increases in a region where the subtransmission mechanism 30 is at the first speed and the primary rotation speed Npri is in the vicinity of the lowest rotation speed line.

A "variator speed ratio at the second speed" in FIG. 4C illustrates variation in the speed ratio vRatio of the variator 20 relative to the vehicle speed VSP when the vehicle speed VSP gradually increases in a region where the subtransmission mechanism 30 is at the second speed and the primary rotation speed Npri is in the vicinity of the lowest rotation speed line.

As shown in FIG. 4B, when the subtransmission mechanism 30 is at the first speed, if the vehicle speed VSP rises in a region where the vehicle speed VSP is on or below the minimum vehicle speed for an upshift line and the primary rotation speed Npri is in the vicinity of the lowest rotation speed line, the speed ratio vRatio of the variator 20 reaches the vicinity of the Highest speed ratio.

When the speed ratio of the variator 20 is in the vicinity of the Highest speed ratio, the efficiency of the variator 20 in terms of the fuel consumption of the internal combustion engine 1 is poor in comparison with a case in which the speed ratio is close to 1.0, and therefore continuous travel in this condition may lead to an increase in the fuel consumption of the internal combustion engine 1.

As shown in FIG. 4C, when the subtransmission mechanism 30 is at the second speed, the speed ratio vRatio of the variator 20 is closer to 1.0 than when the subtransmission mechanism 30 is at the first speed. Therefore, to reduce the fuel consumption of the internal combustion engine 1, the subtransmission mechanism 30 is preferably upshifted from the first speed to the second speed when the speed ratio vRatio of the variator 20 is close to 1.0.

As described above, the two requirements when considering where to upshift the subtransmission mechanism 30, namely shift shock prevention and reduction of the fuel consumption of the internal combustion engine 1, produce contradictory results.

To satisfy the two requirements described above, the shift controller 12 according to this invention executes shift control to be described below.

Figure 5:
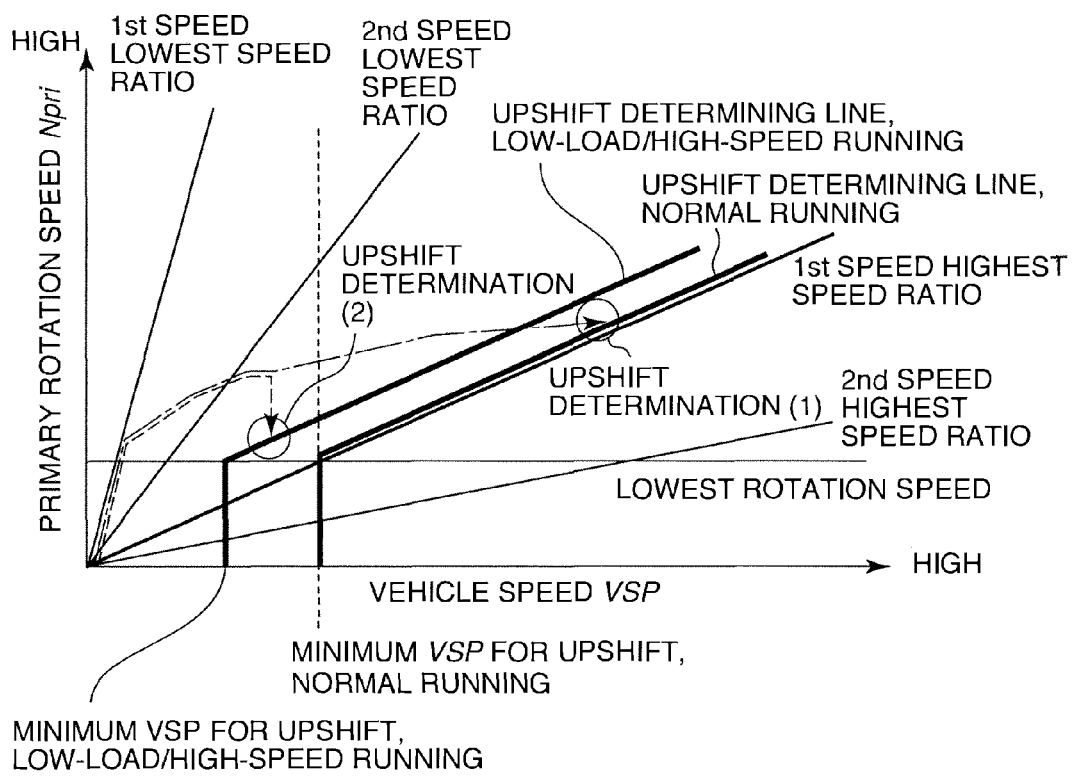
FIG. 5 is a diagram illustrating an upshift determining line of a subtransmission mechanism according to this invention.

Referring to FIG. 5, the shift controller 12 sets a line on which the subtransmission mechanism 30 is in the first speed and the variator 20 is close to the Highest speed ratio as a normal upshift determining line. In a normal running region of the vehicle, the shift controller 12 controls upshifting of the subtransmission mechanism 30 on the basis of the normal upshift determining line. Meanwhile, a state in which the vehicle travels at a lower load or a higher speed than in the normal running region will be referred to as a low load/high speed region. In this region, the shift controller 12 controls upshifting of the subtransmission mechanism 30 on the basis of a low load/high speed region upshift determining line obtained by shifting the normal upshift determining line to a low vehicle speed side.

Figure 6:
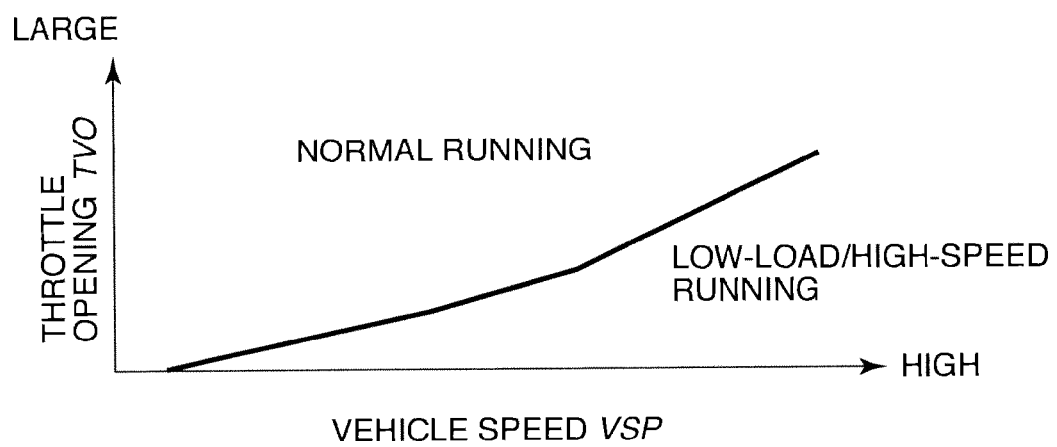
FIG. 6 is a diagram showing characteristics of a map defining a normal running region and a low load/high speed running region, which is stored by the shift controller according to this invention.

Referring to FIG. 6, the normal running region and the low load/high speed region will be described.

The shift controller 12 pre-stores a map having the characteristics shown in FIG. 6, which are determined in advance on the basis of the vehicle speed VSP and the throttle opening TVO, in the storage device 122. A boundary line between two regions shown in the figure corresponds to a throttle opening TVO at which the vehicle can travel on a flat road without a reduction in the vehicle speed VSP.

When a current vehicle travel condition represented by the vehicle speed VSP and the throttle opening TVO corresponds to the normal running region on this map, the shift controller 12 upshifts the subtransmission mechanism 30 on the basis of the normal upshift determining line shown in FIG. 5. When the current vehicle travel condition corresponds to the low load/high speed region, the shift controller 12 upshifts the subtransmission mechanism 30 on the basis of the low load/high speed region upshift determining line shown in FIG. 5.

The low load/high speed region upshift determining line is a line defining a region in which, during travel in the low load/high speed region, the fuel consumption of the internal combustion engine 1 is smaller when the subtransmission mechanism 30 is at the second speed. More specifically, a region on the high vehicle speed side of the low load/high speed region upshift determining line in FIG. 5 corresponds to this region.

The low load/high speed region upshift determining line is obtained by shifting the normal upshift determining line to the low vehicle speed side. The difference between the low load/high speed region upshift determining line and the normal upshift determining line, although dependent on the amount of fuel consumed by the internal combustion engine 1 during a shift in the variator 20, is set at a vehicle speed VSP of 5-10 km/hr, for example.

To ensure that the subtransmission mechanism 30 is shifted reliably to the second speed, at which fuel performance is more favorable, during travel in the low load/high speed region, the boundary line in FIG. 6 may be set at a slightly larger throttle opening than the throttle opening at which the vehicle can travel on a flat road without a reduction in the vehicle speed VSP.

Referring back to FIG. 5, upshift control performed on the subtransmission mechanism 30 by the shift controller 12 when the subtransmission mechanism 30 is in the normal running region and the low load/high speed region will be described.

Vehicle startup is performed in the normal running region. In this case, as shown by a dot-dash line in the figure, the vehicle speed VSP and the primary rotation speed Npri start from zero and increase gradually along the first speed Lowest speed ratio line.

Once the vehicle speed VSP and the primary rotation speed Npri have increased along the first speed Lowest speed ratio line to a certain degree, they start to increase along a predetermined shift line based on the throttle opening TVO.

When the operating point represented by the vehicle speed VSP and the primary rotation speed Npri varies across the normal upshift determining line in the figure, the shift controller 12 upshifts the subtransmission mechanism 30 from the first speed to the second speed.

During this upshift, the speed ratio vRatio of the variator 20 is in the vicinity of the Highest speed ratio, and therefore shift shock accompanying the upshift in the subtransmission mechanism 30 is suppressed to a low level.

When a throttle pedal release operation is performed after the vehicle speed VSP and the primary rotation speed Npri increase gradually along the first speed Lowest speed ratio line from zero, the vehicle speed VSP and the primary rotation speed Npri displace toward the low load/high speed region, as shown by a broken line in the figure.

The shift controller 12 then determines that the travel condition of the vehicle has varied from the normal running region to the low load/high speed region on the basis of the vehicle speed VSP and the throttle opening TVO by referring to the map having the characteristics shown in FIG. 6.

In accordance with this determination, the shift controller 12 switches upshift determination in relation to the subtransmission mechanism 30 from the normal upshift determining line to the low load/high speed region upshift determining line.

Next, the shift controller 12 determines whether or not the vehicle running condition shown by a broken line in FIG. 5 has crossed the low load/high speed region upshift determining line, and when the determination switches from a negative result to an affirmative result, the shift controller 12 upshifts the subtransmission mechanism 30 from the first speed to the second speed.

In FIG. 5, the position in which the vehicle running condition shown by the broken line crosses the low load/high speed region upshift determining line is substantially midway between the second speed Lowest speed ratio line and the first speed Highest speed ratio line. The speed ratio vRatio of the variator 20 in this position is close to 1.0. Hence, by upshifting the subtransmission mechanism 30, the variator 20 can be operated in a speed ratio region where maximum efficiency is achieved in terms of the fuel consumption of the internal combustion engine 1.

By thus permitting a small amount of shift shock during upshifting the subtransmission mechanism 30 in the low load/high speed region, the variator 20 can be operated in the speed ratio region where maximum efficiency is achieved in terms of the fuel consumption of the internal combustion engine 1. Hence, by performing this control, a reduction in the fuel consumption of the internal combustion engine 1 can be achieved.

Next, referring to FIG. 7, the low load/high speed region upshift determining line will be described.

This figure shows a relationship between an overall torque loss and the through speed ratio Ratio of the continuously variable transmission 4.

Friction loss is generated by gears, pulleys, and so on serving as constitutional elements of the variator 20 and the subtransmission mechanism 30 forming the continuously variable transmission 4.

Figure 7:
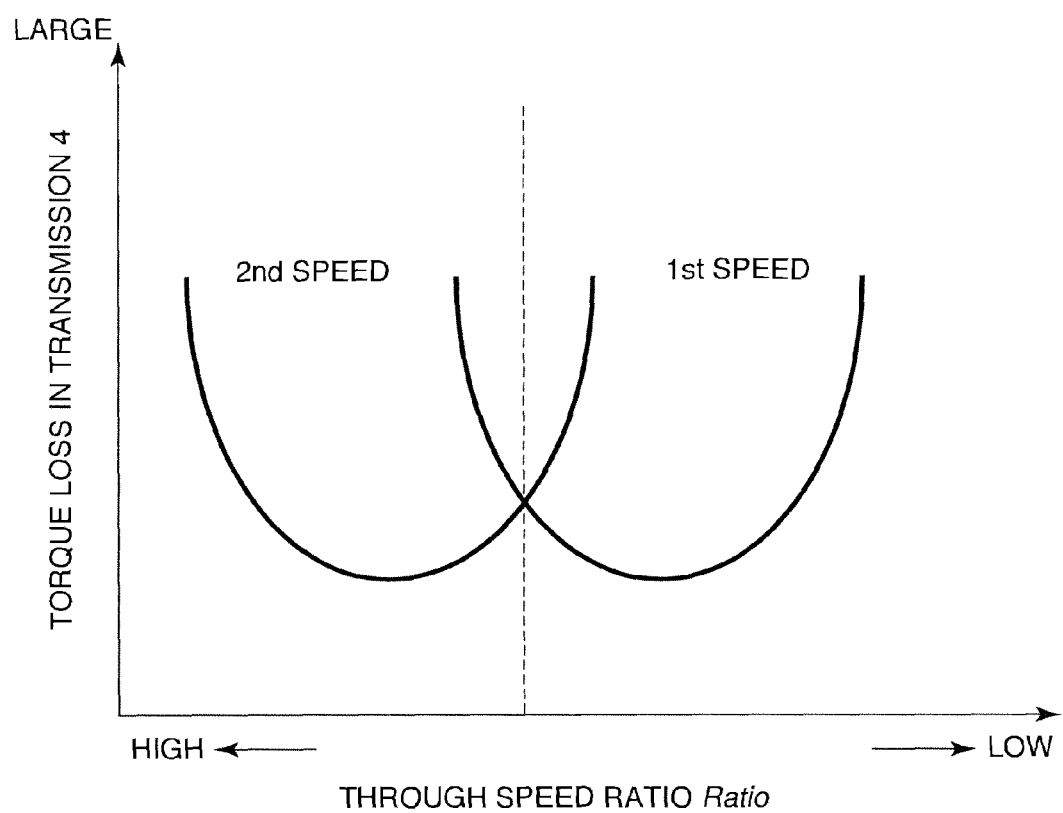
FIG. 7 is a diagram showing a relationship between a torque loss and a through speed ratio of the entire continuously variable transmission.

The overall torque loss of the continuously variable transmission 4 caused by this friction loss differs according to the gear position of the subtransmission mechanism 30, as shown in FIG. 7.

Here, the through speed ratio Ratio in a position where a torque loss curve when the subtransmission mechanism 30 is in the first speed intersects a torque loss curve when the subtransmission mechanism 30 is in the second speed is determined. The determined vehicle speed VSP is represented in FIG. 5 by a straight line passing through an origin. An intersection between this straight line and the lowest rotation speed is set as the minimum vehicle speed for an upshift on the low load/high speed region upshift determining line. Further, the low load/high speed region upshift determining line is obtained by shifting the normal upshift determining line so that it passes through this intersection.

Figure 8:
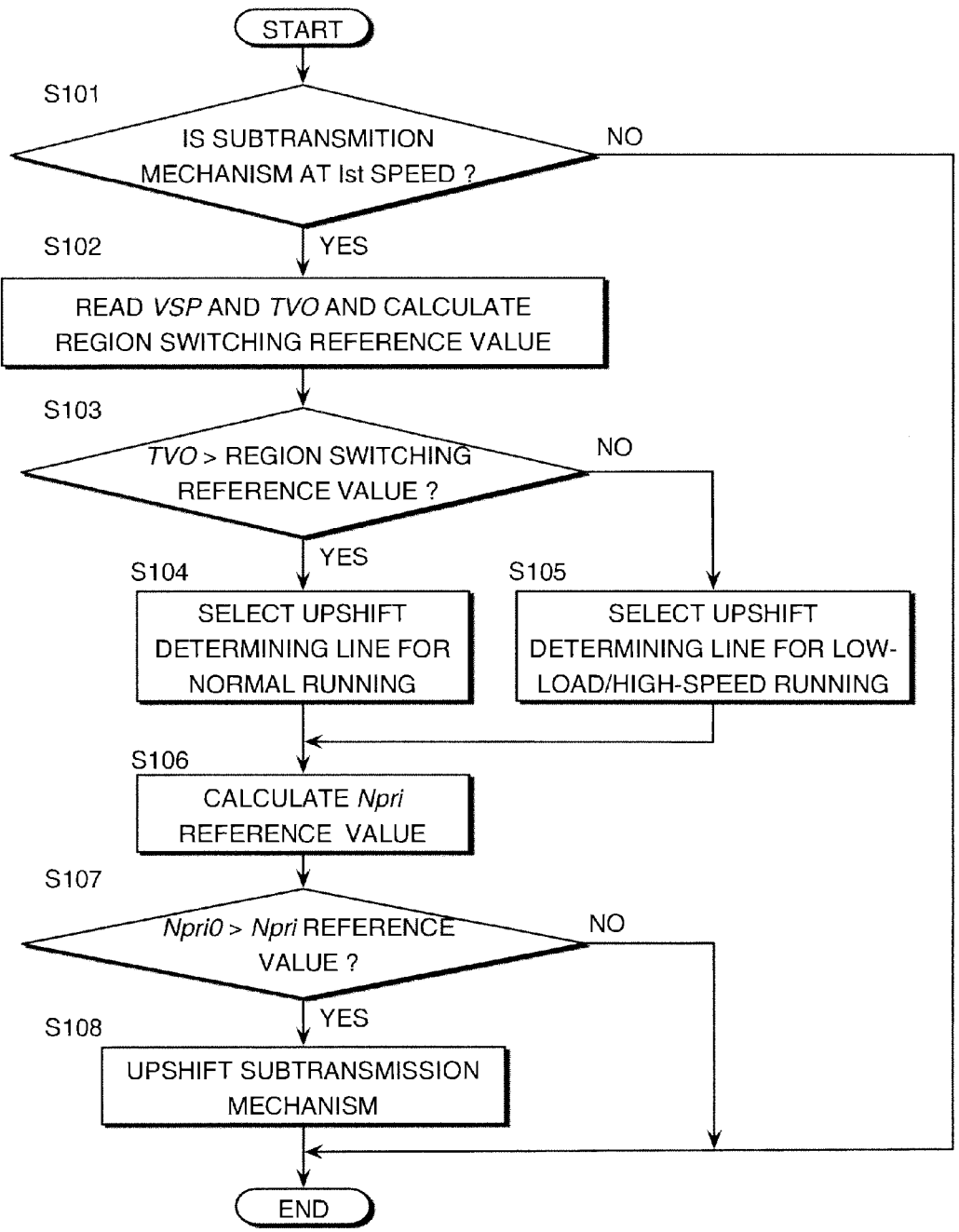
FIG. 8 is a flowchart illustrating a shift control routine executed by the shift controller according to this invention.

Referring to FIG. 8, a shift control routine executed by the shift controller 12 to apply the two upshift determining lines shown in FIG. 5 selectively will now be described.

This routine is stored in the storage device 122 of the shift controller 12 in the form of a program and executed by having the CPU 121 read and execute the program. The shift controller 12 executes this routine repeatedly at fixed time intervals of 10 milliseconds, for example, while the vehicle travels.

In a step S101, the shift controller 12 determines whether or not a current operating position of the subtransmission mechanism 30 is the first speed.

When the subtransmission mechanism 30 is not in the first speed, the shift controller 12 terminates the routine immediately without performing the processing of the other steps.

When the subtransmission mechanism 30 is in the first speed, the shift controller 12 reads the current vehicle speed VSP and throttle valve opening TVO in a step S102. Further, the shift controller 12 determines the throttle valve opening TVO to serve as the running region boundary from the current vehicle speed VSP by searching the map having the characteristics shown in FIG. 6, which is stored in the storage device 122 in advance. The determined value will be referred to as a region switching reference value.

Next, in a step S103, the shift controller 12 determines whether or not the current throttle valve opening TVO exceeds the region switching reference value.

When the current throttle valve opening TVO exceeds the region switching reference value, the shift controller 12 selects the normal upshift determining line in a step S104 by referring to the shift map having the characteristics shown in FIG. 5, which is stored in the storage device 122 in advance.

When it is determined that the current throttle valve opening TVO does not exceed the switching opening, the shift controller 12 selects the low load/high speed region upshift determining line in a step S105 by referring to the shift map shown in FIG. 5, which is stored in the storage device 122 in advance.

In a step S106 following the processing of the step S104 or the step S105, the shift controller 12 determines a reference value of the primary rotation speed Npri, which will serve as a determination reference for whether or not an upshift is to be performed, from the current vehicle speed VSP and the selected determining line.

Figure 9:
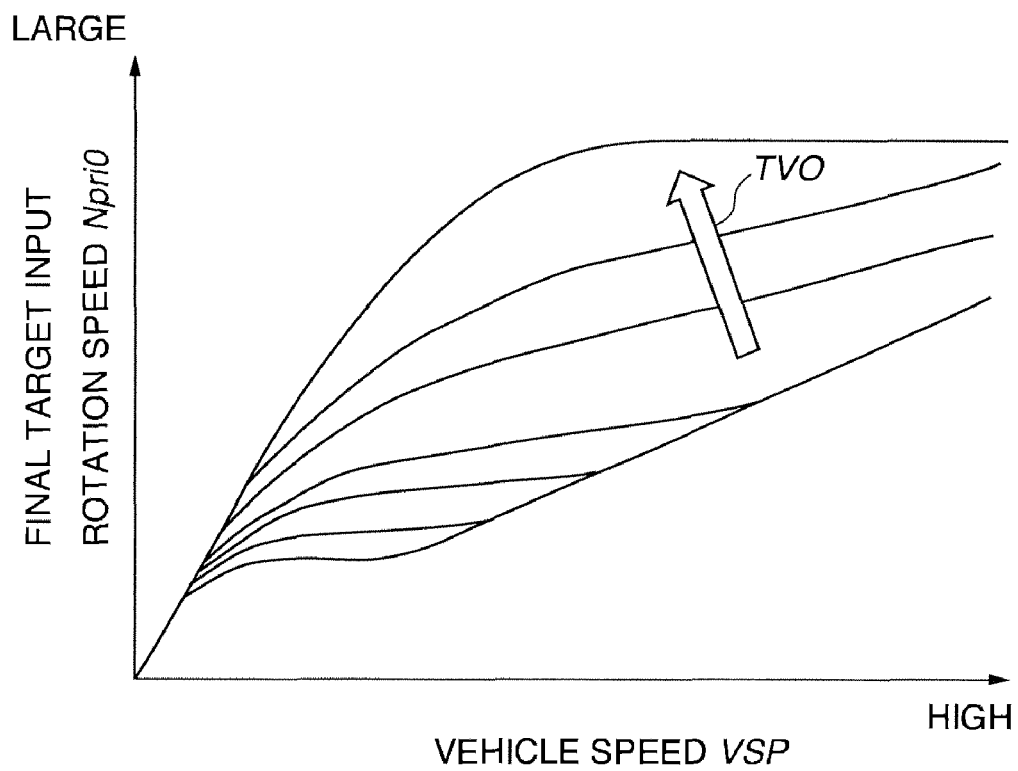
FIG. 9 is a diagram showing characteristics of a final target speed ratio map stored by the shift controller according to this invention.

In a step S107, the shift controller 12 determines a final target value Npri0 of the primary rotation speed Npri from the current vehicle speed VSP and the accelerator opening TVO by searching a shift map having the characteristics shown in FIG. 9, which is stored in the storage device 122 in advance. The shift controller 12 then compares the final target value Npri0 of the primary rotation speed Npri with the reference value determined in the step S106. A method of determining the final target value Npri0 of the primary rotation speed Npri from the current vehicle speed VSP and accelerator opening TVO is available in U.S. Pat. No. 6,157,884, for example.

When the comparison of the step S107 indicates that the final target value Npri0 is larger than the reference value, the shift controller 12 upshifts the subtransmission mechanism 30 from the first speed to the second speed in a step S108. Following the processing of the step S108, the shift controller 12 terminates the routine.

When the comparison of the step S107 indicates that the final target value Npri0 is not larger than the reference value, the shift controller 12 terminates the routine without upshifting the subtransmission mechanism 30.

In the embodiment described above, a determination is made as to whether or not the current vehicle travel condition corresponds to the normal running region or the low load/high speed running region, and in the low load/high speed running region, the subtransmission mechanism 30 is upshifted at a lower vehicle speed than in the normal running region.

Hence, in the low load/high speed running region, opportunities for travel close to a variator speed ratio of 1.0, at which the fuel consumption amount of the internal combustion engine 1 is small, can be increased, and as a result, the fuel consumption of the internal combustion engine 1 can be suppressed.

Meanwhile, in the normal running region, the subtransmission mechanism 30 is upshifted in the vicinity of the Highest speed ratio of the variator 20, and therefore shift shock generated during upshifting of the subtransmission mechanism 30 can be reduced.

Next, referring to FIG. 10, a second embodiment of this invention will be described.

The hardware constitution of this embodiment is identical to that of the first embodiment. The shift controller 12 according to this embodiment performs upshift control on the subtransmission mechanism 30 using a shift map having the characteristics shown in FIG. 10 instead of the shift map having the characteristics shown in FIG. 5.

In the first embodiment, the shift controller 12 switches between the normal upshift determining line and the low load/high speed region upshift determining line, as shown in FIG. 5, whereas in this embodiment, the subtransmission mechanism 30 is upshifted using a single upshift determining line.

The minimum vehicle speed for an upshift on the single upshift determining line is set similarly to the minimum vehicle speed for an upshift on the low load/high speed region upshift determining line of the first embodiment. In the region where the primary rotation speed Npri is equal to or greater than the lowest rotation speed, the normal upshift determining line of the first embodiment is applied.

Figure 10:
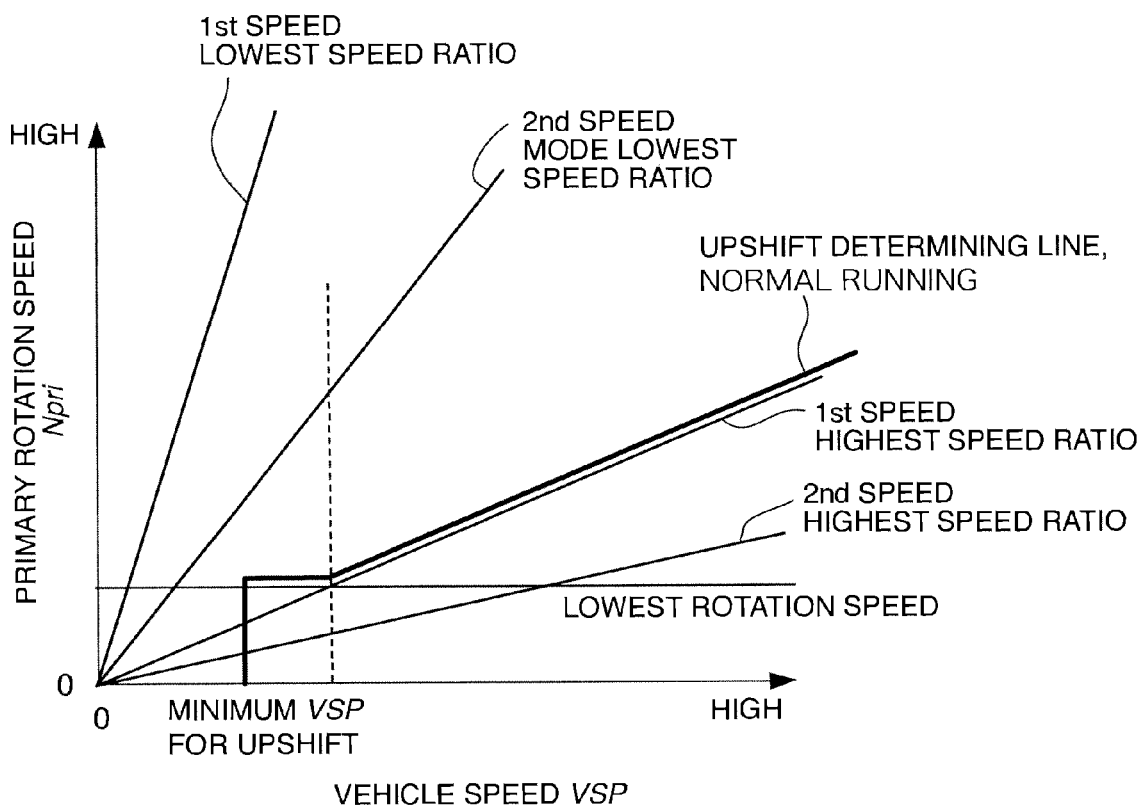
FIG. 10 is a diagram illustrating an upshift determining line of a subtransmission mechanism according to another embodiment of this invention.

A straight line representing the minimum vehicle speed for an upshift and the normal upshift determining line shown in FIG. 10 are connected by a horizontal line passing through a slightly higher primary rotation speed Npri than the lowest rotation speed. The shift controller 12 upshifts the subtransmission mechanism 30 using the single upshift determining line set in this manner.

According to this embodiment, when the single upshift determining line is applied, the subtransmission mechanism 30 is upshifted at a similar low vehicle speed to the minimum vehicle speed for an upshift of the low load/high speed region according to the first embodiment in a vehicle operating region where the primary rotation speed Npri is on or below the lowest rotation speed line.

By performing this early upshift, the fuel consumption of the internal combustion engine 1 can be reduced similarly to the first embodiment in a vehicle speed region on the low side of the minimum vehicle speed for an upshift.

The contents of Tokugan 2009-169178, with a filing date of Jul. 17, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A shift control device for a continuously variable transmission that is connected to an internal combustion engine installed in a vehicle, the continuously variable transmission comprising a continuously variable transmission mechanism that modifies a speed ratio continuously and a subtransmission mechanism that is connected in series to the continuously variable transmission mechanism and applies a first speed and a second speed that is higher than the first speed selectively, the shift control device comprising:

a sensor that detects an operating condition of the vehicle; and a programmable controller programmed to:

determine, on the basis of the operating condition of the vehicle, whether the vehicle is running under a normal upshift condition or under a low load/high speed upshift condition having a lower load or a higher speed than the normal upshift condition; and when the vehicle is running under the low load/high speed upshift condition, control the subtransmission mechanism such that the sub transmission mechanism is upshifted from the first speed to the second speed at a lower vehicle speed than when the vehicle is running under the normal upshift condition.

2. The shift control device as defined in claim 1, wherein the sensor comprises a sensor that detects an engine load and a sensor that detects a vehicle speed, and the controller is further programmed to determine whether the vehicle is running under the normal upshift condition or under the low load/high speed upshift condition having a lower load or a higher speed than the normal upshift condition on the basis of the engine load and the vehicle speed.

3. The shift control device as defined in claim 2, wherein the controller is further programmed to:

select a normal upshift determining line set in advance in accordance with a final target rotation speed and the vehicle speed when the vehicle is running under the normal upshift condition;

select a low load/high speed upshift determining line obtained by shifting the normal upshift determining line to a low vehicle speed side when the vehicle is running under the low load/high speed upshift condition;

calculate the final target rotation speed of the continuously variable transmission from the engine load and the vehicle speed; and determine whether or not to upshift the subtransmission mechanism on the basis of the vehicle speed, the final target rotation speed, and the selected determining line.

4. The shift control device as defined in claim 3, wherein the controller is further programmed to refrain from upshifting the subtransmission mechanism at a lower vehicle speed than a minimum vehicle speed for an upshift, which is determined from a minimum input rotation speed of the continuously variable transmission corresponding to a minimum rotation speed of the internal combustion engine and a speed ratio of the continuously variable transmission at which a torque loss generated in the continuously variable transmission when the subtransmission mechanism is at the first speed equals a torque loss generated in the continuously variable transmission when the subtransmission mechanism is at the second speed.

5. The shift control device as defined in claim 2, wherein the controller is further programmed to determine that the vehicle is running under the low load/high speed upshift condition when the current engine load is equal to or smaller than a region switching reference value relating to an engine load at which the vehicle can maintain the current vehicle speed on a flat road.

6. The shift control device as defined in claim 2, wherein the sensor that detects the engine load is constituted by a throttle sensor that detects a throttle opening of the internal combustion engine.

7. A shift control device for a continuously variable transmission connected to an internal combustion engine installed in a vehicle, the continuously variable transmission comprising a continuously variable transmission mechanism that modifies a speed ratio continuously and a subtransmission mechanism that is connected in series to the continuously variable transmission mechanism and applies a first speed and a second speed that is higher than the first speed selectively, the shift control device comprising:

means for detecting an operating condition of the vehicle;

means for determining, on the basis of the operating condition of the vehicle, whether the vehicle is running under a normal upshift condition or under a low load/high speed upshift condition having a lower load or a higher speed than the normal upshift condition; and means for controlling the subtransmission mechanism when the vehicle is running under the low load/high speed upshift condition such that the subtransmission mechanism is upshifted from the first speed to the second speed at a lower vehicle speed than when the vehicle is running under the normal upshift condition.

8. A shift control method for a continuously variable transmission that is connected to an internal combustion engine installed in a vehicle, the continuously variable transmission comprising a continuously variable transmission mechanism that modifies a speed ratio continuously and a subtransmission mechanism that is connected in series with the continuously variable transmission mechanism and applies a first speed and a second speed that is higher than the first speed selectively, the shift control method comprising:

detecting an operating condition of the vehicle;

determining, on the basis of the operating condition of the vehicle, whether the vehicle is running under a normal upshift condition or under a low load/high speed upshift condition having a lower load or a higher speed than the normal upshift condition; and controlling the subtransmission mechanism when the vehicle is running under the low load/high speed upshift condition such that the subtransmission mechanism is upshifted from the first speed to the second speed at a lower vehicle speed than when the vehicle is running under the normal upshift condition.

9. A shift control device for a continuously variable transmission that is connected to an internal combustion engine installed in a vehicle, the continuously variable transmission comprising a continuously variable transmission mechanism that modifies a speed ratio continuously and a subtransmission mechanism that is connected in series with the continuously variable transmission mechanism and applies a first speed and a second speed that is higher than the first speed selectively, the shift control device comprising a controller programmed to:

control the subtransmission mechanism such that the subtransmission mechanism performs an upshift from the first speed to the second speed when a vehicle speed passes a minimum vehicle speed for an upshift, which is determined from a minimum input rotation speed of the continuously variable transmission at which the vehicle can maintain the vehicle speed on a flat road and a speed ratio of the continuously variable transmission at which a torque loss generated in the continuously variable transmission when the subtransmission mechanism is at the first speed equals a torque loss generated in the continuously variable transmission when the subtransmission mechanism is at the second speed, and a rotation speed of the continuously variable transmission is equal to or lower than the minimum input rotation speed of the continuously variable transmission corresponding to a minimum rotation speed of the internal combustion engine.

* * * * *